United States Patent
Koyama et al.

(10) Patent No.: US 9,705,370 B2
(45) Date of Patent: Jul. 11, 2017

(54) ARMATURE WINDING OF ELECTRICAL ROTATING APPARATUS, ELECTRICAL ROTATING APPARATUS USING THE SAME, AND METHOD OF MANUFACTURING THE SAME

(71) Applicant: KABUSHIKI KAISHA TOSHIBA, Minato-ku (JP)

(72) Inventors: Mitsuhiko Koyama, Ichihara (JP); Toru Otaka, Kawasaki (JP); Shigehito Ishii, Yokohama (JP); Yoshitaka Sakai, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 337 days.

(21) Appl. No.: 14/549,782

(22) Filed: Nov. 21, 2014

(65) Prior Publication Data
US 2015/0171687 A1  Jun. 18, 2015

(30) Foreign Application Priority Data
Dec. 17, 2013  (JP) ................................. 2013-260487

(51) Int. Cl.
*H02K 3/24* (2006.01)
*B23K 1/20* (2006.01)
(Continued)

(52) U.S. Cl.
CPC ............ *H02K 3/24* (2013.01); *B23K 1/0008* (2013.01); *B23K 1/20* (2013.01); *H02K 15/0414* (2013.01)

(58) Field of Classification Search
CPC .. H02K 3/22; H02K 3/24; H02K 3/30; H02K 15/0414; H02K 15/0093; H02K 15/14;
(Continued)

(56) References Cited

U.S. PATENT DOCUMENTS 3,517,428 A  6/1970  Gadd
5,557,837 A  9/1996  Thiard-Laforet et al.
(Continued)

FOREIGN PATENT DOCUMENTS

CN   1138771 A   12/1996
CN   1728512 A   2/2006
(Continued)

OTHER PUBLICATIONS

Office Action issued Sep. 27, 2016 in Korean Patent Application No. 10-2014-0179303 (with English translation).
(Continued)

*Primary Examiner* — Tran Nguyen
(74) *Attorney, Agent, or Firm* — Oblon, McClelland, Maier & Neustadt, L.L.P.

(57) ABSTRACT

According to one embodiment, an armature winding includes a plurality of rectangular solid conductors and a plurality of rectangular hollow conductors, which are arranged such that tip of end portions thereof form one surface, the surface being coated with a brazing filler material, and an anti-flowing agent applied on a portion of an inner surface of each hollow conductor to prevent the brazing filler material from flowing into hollow portions of the hollow conductors.

9 Claims, 3 Drawing Sheets

(51) Int. Cl.
*B23K 1/00* (2006.01)
*H02K 15/04* (2006.01)

(58) Field of Classification Search
CPC .......... H02K 5/22; H02K 9/19; B23K 1/0008;
B23K 1/20; B23K 35/30
USPC ......... 29/596, 598, 603.25; 310/52, 54, 201,
310/254.1; 228/179.1, 183, 215, 245
See application file for complete search history.

(56) References Cited

U.S. PATENT DOCUMENTS

| | | | |
|---|---|---|---|
| 5,605,590 A | 2/1997 | Manning et al. | |
| 5,796,189 A * | 8/1998 | Manning | B23K 1/20 228/179.1 |
| 6,784,573 B1 * | 8/2004 | Iversen | B23K 33/00 310/201 |
| 7,216,796 B2 * | 5/2007 | Breznak | B23K 1/0018 228/245 |
| 7,334,316 B2 * | 2/2008 | Wang | H02K 3/22 219/129 |
| 2005/0247762 A1 | 11/2005 | Breznak et al. | |
| 2006/0021212 A1 * | 2/2006 | Wang | H02K 3/22 29/596 |
| 2006/0108401 A1 | 5/2006 | Breznak et al. | |
| 2007/0068998 A1 * | 3/2007 | Silliman | B23K 1/0008 228/179.1 |
| 2008/0129127 A1 * | 6/2008 | Wang | H02K 3/22 310/52 |
| 2013/0069478 A1 * | 3/2013 | Hamer | H02K 3/30 310/215 |

FOREIGN PATENT DOCUMENTS

| | | |
|---|---|---|
| CN | 1790881 A | 6/2006 |
| JP | 8-103046 | 4/1996 |
| JP | 10-215534 | 8/1998 |
| JP | 2006-60994 A | 3/2006 |
| JP | 5054913 | 10/2012 |

OTHER PUBLICATIONS

Extended European Search Report issued on Aug. 30, 2016 in Patent Application No. 14194489.2.
Office Action issued Mar. 9, 2016 in Korean Patent Application No. 10-2014-0179303 (with English language translation).
Office Action Issued Nov. 28, 2016 in Korean Patent Application No. 10-2014-0179303 (with English language translation).
Combined Chinese Office Action and Search Report issued on Oct. 9, 2016 in Patent Application No. 201410759528.7 (with English translation).

* cited by examiner

ARMATURE WINDING OF ELECTRICAL ROTATING APPARATUS, ELECTRICAL ROTATING APPARATUS USING THE SAME, AND METHOD OF MANUFACTURING THE SAME

CROSS-REFERENCE TO RELATED APPLICATIONS

This application is based upon and claims the benefit of priority from Japanese Patent Application No. 2013-260487, filed Dec. 17, 2013, the entire contents of which are incorporated herein by reference.

FIELD

Embodiments described herein relate generally to an armature winding of an electrical rotating apparatus, an electrical rotating apparatus using the same, and a method of manufacturing the same.

BACKGROUND

The arrangement of a stator coil of a general water-cooled generator (a generator adopting a water cooling system) will be explained with reference to FIGS. 5 and 6. FIG. 5 is a longitudinal sectional view showing the arrangement of an end portion of the stator coil. FIG. 6 is a front view showing the end portion of the stator coil when viewed from a clip side.

The stator coil includes a clip 1, a clip cover 2, preplaced brazing filler materials 3, hollow conductors 4, hollow portions 5, a brazing filler materials reservoir 6, a coolant inlet/outlet 7, and solid conductors 8. The preplaced brazing filler materials 3 shown in FIG. 5 are unmelted brazing filler material foils. Note that in the following explanation, the hollow conductors 4 and solid conductors 8 will collectively be referred to as wire conductors in some cases, and hollow conductors 4 will simply be referred to as wires in some cases.

The stator coil of the water-cooled generator is formed by binding a plurality of rectangular hollow conductors 4 and a plurality of rectangular solid conductors 8. Deionized water circulates in the hollow portions 5 of the hollow conductors 4 through the coolant inlet/outlet 7 in order to directly cool the hollow conductors 4 with water. The clip (copper frame) 1 is used to electrically and mechanically connect between the hollow conductors 4 and the solid conductors 8. The clip 1, hollow conductors 4, and solid conductors 8 are joined by brazing. To braze the clip 1, hollow conductors 4, and solid conductors 8, the preplaced brazing filler materials (brazing filler material foils) 3 are placed between the conductors and heated following a predetermined heating procedure while the brazing filler materials are pressed through the clip cover 2 and the temperature is measured with a thermocouple. Consequently, the brazing filler material melts and penetrates between the conductors and between the clip 1 and conductors, thereby combining them. Any excess melted brazing filler materials are collected by the brazing filler materials reservoir 6.

To prevent the molten brazing filler material from entering the hollow portions 5 of the hollow conductors 4 and plugging the holes, the tip of end portions of the preplaced brazing filler materials 3 are slightly retreated inside from the tip of end portions of the hollow conductors 4 and solid conductors 8, as shown in, e.g., FIG. 5. In accordance with this, a sidewall 14 (including a sidewall of the brazing filler materials reservoir 6) inside the clip 1 surrounding the hollow conductors 4 and solid conductors 8 shown in FIG. 5 and FIG. 6 is also retreated inside.

In this arrangement, no brazing filler material enters the hollow portions 5 of the hollow conductors 4, but narrow gaps 13 form in the boundaries between the hollow conductors 4 and/or solid conductors 8, and a coolant enters and stays in these narrow gaps. Consequently, a galvanic corrosion phenomenon occurs in these gaps and dissolves the conductors. This makes the conventional method as described above undesirable.

Under the circumstances, it is desired to provide an armature winding of an electrical rotating apparatus, an electrical rotating apparatus using the same, and a method of manufacturing the same, by which it is possible to prevent a coolant remaining between conductors, and prevent a brazing filler material from entering a hollow portion of a hollow conductor.

DETAILED DESCRIPTION

In general, according to one embodiment, an armature winding includes a plurality of rectangular solid conductors and a plurality of rectangular hollow conductors, which are arranged such that tip of end portions thereof form one surface, the surface being coated with a brazing filler material, and an anti-flowing agent applied on a portion of an inner surface of each hollow conductor to prevent the brazing filler material from flowing into hollow portions of the hollow conductors.

Hereinafter, embodiments will be described with reference to the accompanying drawings.

Figure 1:
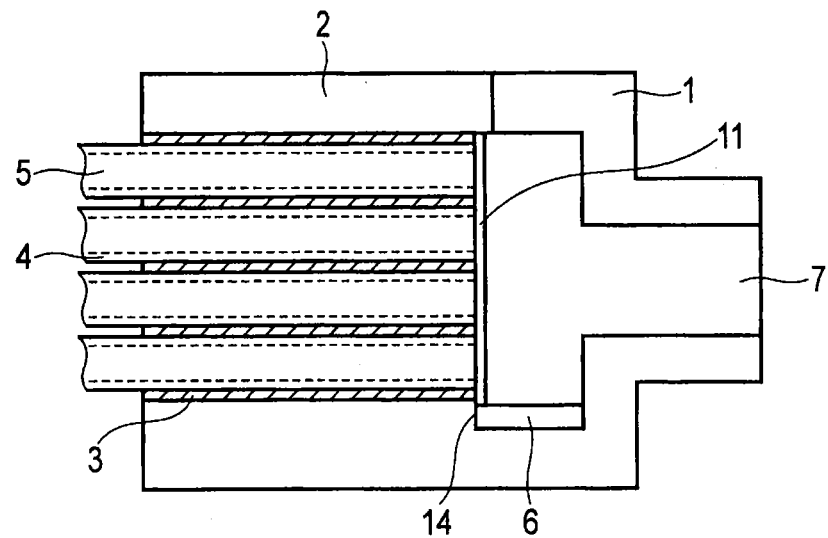
FIG. 1 is a longitudinal sectional view showing the arrangement of an end portion of a stator coil of a water-cooled generator according to an embodiment.
Figure 2:
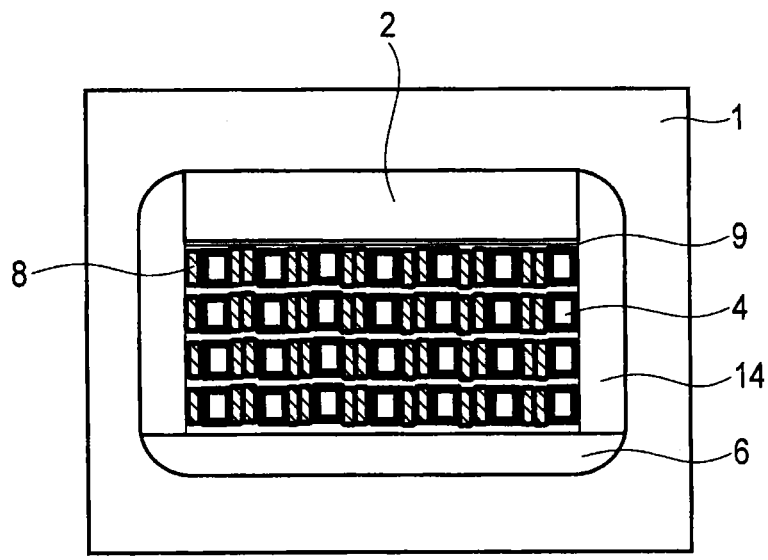
FIG. 2 is a front view showing the end portion of the stator coil when viewed from a clip side.
Figure 3:
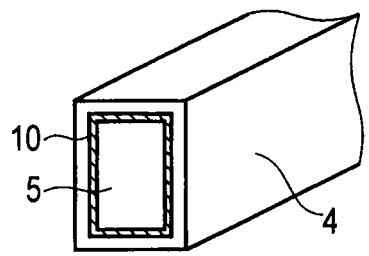
FIG. 3 is a perspective view showing a state in which the inner surfaces of a hollow conductor as a constituent element of the stator coil are coated with an anti-flowing agent.
Figure 5:
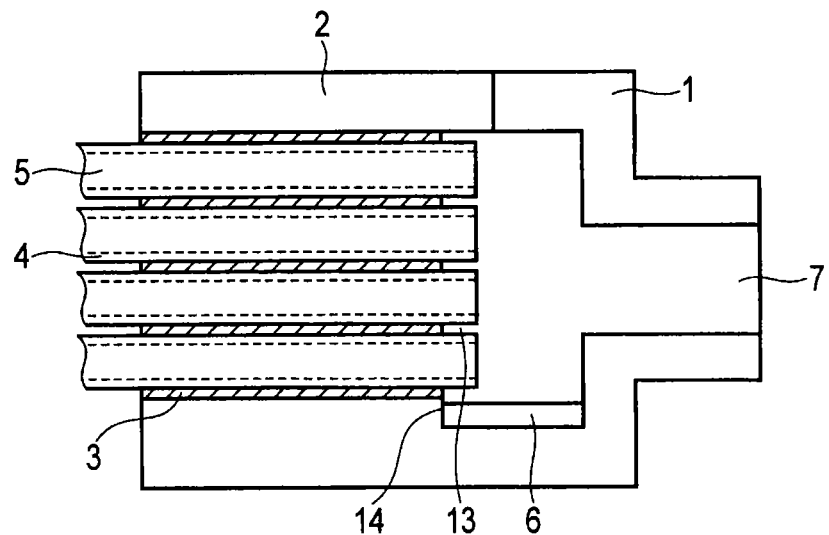
FIG. 5 is a longitudinal sectional view showing the arrangement of an end portion of a stator coil of a conventional water-cooled generator.
Figure 6:
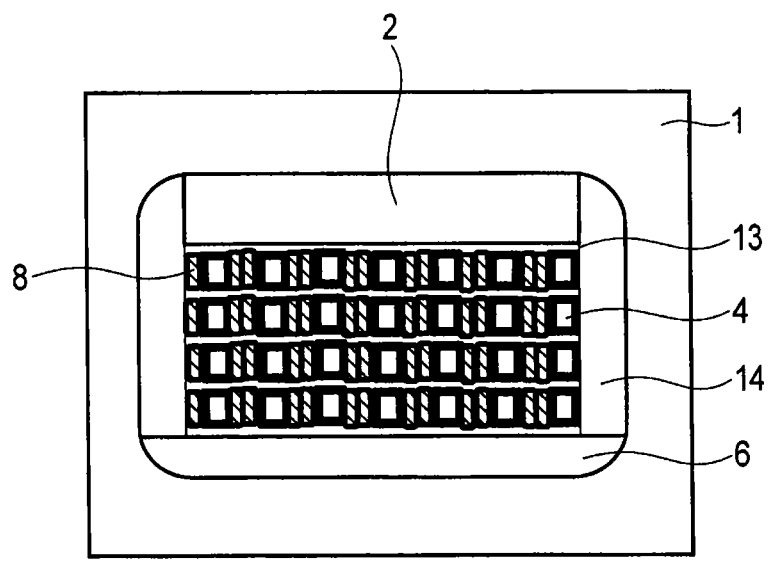
FIG. 6 is a front view showing the end portion of the stator coil of the conventional water-cooled generator when viewed from a clip side.

FIG. 1 is a longitudinal sectional view showing the arrangement of an end portion of a stator coil of a water-cooled generator according to the embodiment. FIG. 2 is a front view showing the end portion of the stator coil when viewed from a clip side. FIG. 3 is a perspective view showing a state in which the inner surfaces of a hollow conductor as a constituent element of the stator coil are coated, with an anti-flowing agent. Note that the same reference numerals as in FIGS. 5 and 6 described above denote the same elements.

The stator coil includes a clip 1, a clip cover 2, preplaced brazing filler materials 3 (or molten brazing filler materials 9), hollow conductors 4, hollow portions 5, a brazing filler materials reservoir 6, a coolant inlet/outlet 7, solid conductors 8, and an anti-flowing agent 10. The preplaced brazing filler materials 3 shown in FIG. 1 are unmelted brazing filler material foils, and the molten brazing filler materials 9 shown in FIG. 2 are melted brazing filler material foils. Also, a film 11 shown in FIG. 1 is formed when the molten brazing filler material flows out onto the tip of end faces of wires and covers all the end faces.

The stator coil of the water-cooled generator is formed by binding a plurality of rectangular hollow conductors 4 and a plurality of rectangular solid conductors 8. Deionized water circulates in the hollow portions 5 of the hollow conductors 4 through the coolant inlet/outlet 7 in order to directly cool the hollow conductors 4 with water. The clip (copper frame) 1 is used to electrically and mechanically connect the hollow conductors 4 and the solid conductors 8. The clip 1, hollow conductors 4, and solid conductors 8 are combined by brazing. To braze the clip 1, hollow conductors 4, and solid conductors 8, the preplaced brazing filler materials (brazing filler material foils) 3 are placed between the conductors and heated following a predetermined heating procedure while the brazing filler materials are pressed through the clip cover 2 and the temperature is measured with a thermocouple. Consequently, the brazing filler material melts and penetrates between the conductors and between the clip 1 and conductors, thereby combining them. Any excess brazing filler materials are collected by the brazing filler materials reservoir 6.

Especially in this embodiment, the solid conductors 8 and hollow conductors 4 are arranged such that their tips of end portions form one surface. This surface will be referred to as a wire tip of end face. Also, the tip of end portions of the preplaced brazing filler materials 3 are aligned with the position of the wire tip of end face as shown in FIG. 1. In addition, a sidewall 14 (including a sidewall of the brazing filler materials reservoir 6) inside the clip 1 surrounding the hollow conductors 4 and solid conductors 8 shown in FIG. 2 is also aligned with the position of the wire tip of end face. Furthermore, as shown in FIG. 3, the inner surfaces of each hollow conductor 4 are partially coated with the anti-flowing agent 10 which prevents the brazing filler material from flowing into the hollow portions 5 of the hollow conductors 4.

In this arrangement, the preplaced brazing filler materials 3 melt and penetrate into the boundary portions between the hollow conductors 4 and solid conductors 8, and no gap forms between conductors. Accordingly, it is possible to prevent a coolant entering, remaining in gap, and causing a galvanic corrosion phenomenon which would otherwise dissolve the conductors. In addition, the anti-flowing agent 10 can prevent the brazing filler material from entering the hollow portions 5 of the hollow conductors 4.

A method of manufacturing the stator coil will be explained in more detail below.

The hollow conductors 4 and solid conductors 8 are woven, and the tip of end portions of the wire conductors are polished by a polishing material in order to improve the bondability of the brazing filler material.

After that, only portions of the inner surfaces of each hollow conductor 4 are coated with the anti-flowing agent 10.

The anti-flowing agent 10 is a mixture of an inorganic filler such as alumina, titania, or magnesia, and organic binders such as water and polyvinyl alcohol, and is in the form of a paint. The anti-flowing agent 10 has the property that the water and organic material evaporate and disappear by vaporization during a heating step of a brazing work, and the inorganic material remains by adhering to the inner surfaces of the hollow conductors.

The anti-flowing agent 10 as described above is applied to only the inner surfaces of the hollow conductors 4 by using a toothpick-like tool. The application region is a predetermined distance from the wire tip of end face, e.g., 5 mm. The anti-flowing agent 10 is not applied to the wire tip of end face. If the anti-flowing agent 10 is applied to the wire tip of end face by mistake, the applied agent is removed by using a solvent such as alcohol.

The conductors bundle thus prepared is fitted in the clip (copper frame) 1 and pressed through the clip cover 2 so that the conductors bundle is completely covered. In this state, brazing is performed by using a high-frequency inductive heater or the like. During this brazing, heating is performed while preventing the oxidation of the conductor copper by supplying an inert gas such as Ar or a reducing gas such as $H_2$ from a side of the stator coil, which is opposite to a side where brazing is performed.

When the temperature is raised, water in the anti-flowing agent 10 starts vaporizing at around 100° C. Water vapor generated by this vaporization is exhausted outside the clip 1 by the above-mentioned inert gas or the like.

Then, the organic binder such as polyvinyl alcohol starts thermal decomposition at about 250° C. to 350° C. A vaporized gas such as carbon dioxide gas generated by this thermal decomposition is also exhausted by the inert gas or the like.

When the temperature further rises and reaches around 650° C. as a brazing temperature, only the inorganic filler remains on the inner surfaces of the hollow conductors 4. The preplaced brazing filler material starts melting from around 650° C., and flows into gaps between the wire conductors when the temperature reaches around 730° C. at which face-fed brazing of the clip cover 2 is performed. In addition, the brazing filler material flows out onto the wire tip of end face, and the brazing filler material film 11 covers the entire end face. When the brazing filler material flows down, the action of the anti-flowing agent 10 prevents the brazing filler material from entering the hollow portions 5 of the hollow conductors 4.

When the preplaced brazing filler material melts and flows down, the brazing filler material penetrates between the wire conductors and covers the wire tip of end face, and the any excess of the brazing filler material flows down to the brazing filler materials reservoir 6 of the clip 1.

When the brazing is completed, the anti-flowing agent 10 remaining in the hollow portions 5 of the hollow conductors 4 contains only the inorganic material. This inorganic material slightly peels off and flows due to the stream of deionized water in a later flushing step or when the generator is actually operated, but the amount is very small, so this inorganic material does not close the hollow conductors 4. Also, the inorganic material does not increase the electric conductivity of the deionized water. Furthermore, the inorganic material can be trapped by a filter having a mesh of a few microns. This obviates the need for a step of removing the anti-flowing agent 10 after the brazing.

Figure 4:
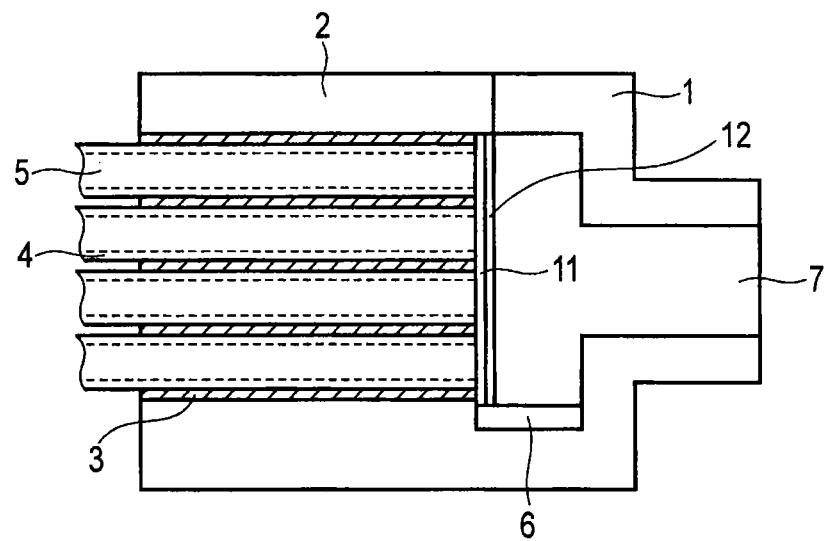
FIG. 4 is a longitudinal sectional view showing the arrangement of the end portion of the stator coil when a film of a ceramic material is added.

Note that the above-described manufacturing method is an example, and the present invention is not limited to this. For example, as shown in FIG. 4, after being coated with the brazing filler materials film 11, the wire tip of end face may further be coated with a film 12 of a ceramic material by thermally spraying the ceramic material. In this case, even when a small gap is formed in the brazing filler materials film 11, the protection provided by the ceramic material film 12 can prevent the entry, stagnation of a coolant, and metal corrosion, thereby improving the corrosion resistance.

As has been described in detail above, the embodiment of the present invention can prevent a coolant remaining between the conductors, and prevent the brazing filler material from entering the hollow portions of the hollow conductors.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An armature winding comprising:
 a plurality of rectangular solid conductors and a plurality of rectangular hollow conductors, which are arranged such that tips of end portions thereof form one surface which corresponds to a wire-tip end face;
 a brazing filler material covering the wire-tip end face; and
 an anti-flowing agent adhering to a part of an inner surface of each hollow conductor in a region at a predetermined distance from the wire-tip end face so as not to be applied to the wire-tip end face to prevent the brazing filler material from flowing into hollow portions of the hollow conductors.

2. The winding according to claim 1, wherein the anti-flowing agent contains an inorganic material, and also contains an organic material and water as binders.

3. The winding according to claim 1, wherein the anti-flowing agent has a property that the water and the organic material evaporate and disappear by vaporization during a heating process of a brazing work, and the inorganic material remains by adhering to the inner surface of each hollow conductor.

4. The winding according to claim 1, wherein the wire-tip end face is further coated with a ceramic material by thermal spraying after being coated with the brazing filler material.

5. An electrical rotating apparatus comprising an armature winding according to claim 1.

6. A method of manufacturing an armature winding, comprising:
 arranging, inside a clip, a plurality of rectangular solid conductors and a plurality of rectangular hollow conductors such that tips of end portions thereof form one surface which corresponds to a wire-tip end face;
 applying an anti-flowing agent on a part of an inner surface of each hollow conductor in a region at a predetermined distance from the wire-tip end face so as not to be applied to the wire-tip end face to prevent a brazing filler material from flowing into hollow portions of the hollow conductors; and
 coating the wire-tip end face with the brazing filler material by heating the clip.

7. The method according to claim 6, wherein the anti-flowing agent contains an inorganic material, and also contains an organic material and water as binders.

8. The method according to claim 6, wherein the anti-flowing agent has a property that the water and the organic material evaporate and disappear by vaporization during a heating process of a brazing work, and the inorganic material remains by adhering to the inner surface of each hollow conductor.

9. The method according to claim 6, further comprising, after the coating of the wire-tip end face with the brazing filler material, further coating the wire-tip end face with a ceramic material by thermal spraying.

* * * * *